(12) United States Patent
Pollach et al.

(10) Patent No.: US 10,740,658 B2
(45) Date of Patent: Aug. 11, 2020

(54) OBJECT RECOGNITION AND CLASSIFICATION USING MULTIPLE SENSOR MODALITIES

(71) Applicant: Mentor Graphics Corporation, Wilsonville, OR (US)

(72) Inventors: Matthias Arnold Pollach, Munich (DE); Ljubo Mercep, Munich (DE)

(73) Assignee: Mentor Graphics Corporation, Wilsonville, OR (US)

( * ) Notice: Subject to any disclaimer, the term of this patent is extended or adjusted under 35 U.S.C. 154(b) by 115 days.

(21) Appl. No.: 15/260,141

(22) Filed: Sep. 8, 2016

(65) Prior Publication Data

US 2018/0068206 A1 Mar. 8, 2018

(51) Int. Cl.
*G06K 9/62* (2006.01)
*G06K 9/00* (2006.01)
*G06K 9/32* (2006.01)

(52) U.S. Cl.
CPC ....... *G06K 9/6289* (2013.01); *G06K 9/00791* (2013.01); *G06K 9/00805* (2013.01); *G06K 9/3233* (2013.01)

(58) Field of Classification Search
CPC .................................................. G06K 9/00805
See application file for complete search history.

(56) References Cited

U.S. PATENT DOCUMENTS

| 7,102,496 | B1 * | 9/2006 | Ernst, Jr. .......... G08G 1/096725 |
| | | | 180/167 |
| 9,097,800 | B1 | 8/2015 | Zhu |
| 9,336,436 | B1 | 5/2016 | Dowdall |
| 9,576,185 | B1 * | 2/2017 | Delp .................. G06K 9/00201 |
| 9,672,446 | B1 * | 6/2017 | Vallespi-Gonzalez ....................... |
| | | | G06K 9/6267 |
| 9,711,050 | B2 * | 7/2017 | Ansari .................... G08G 1/167 |
| 2010/0013615 | A1 * | 1/2010 | Hebert .................. B60Q 9/006 |
| | | | 340/425.5 |
| 2010/0191391 | A1 * | 7/2010 | Zeng ..................... G01S 13/723 |
| | | | 701/1 |

(Continued)

FOREIGN PATENT DOCUMENTS

| WO | 2009/070069 A1 | 6/2009 |
| WO | 2015/139864 A1 | 9/2015 |

OTHER PUBLICATIONS

Coue, C. et al.,"Using Bayesian Programming for Multi-Sensor Multi-Target Tracking in Automotive Applications", Proceedings of the IEEE International Conference on Robotics and Automation, vol. 2, Sep. 14, 2003, pp. 2104-2109.

(Continued)

*Primary Examiner* — Nay A Maung
*Assistant Examiner* — Jose M Torres
(74) *Attorney, Agent, or Firm* — Mentor Graphics Corporation

(57) ABSTRACT

Object recognition and classification based on data from multiple sensor modalities is disclosed. A computing system can detect an event in a monitored portion of an environment coordinate field associated with a vehicle. The computing system can retrieve data associated with the detected event from a plurality of modalities. At least one of the modalities can include raw data from a sensor associated with the vehicle. The computing system can classify the detected event based at least in part on the retrieved data and one or more parameters of a classifier.

17 Claims, 10 Drawing Sheets

(56) References Cited

U.S. PATENT DOCUMENTS

| | | | | |
|---|---|---|---|---|
| 2013/0054106 A1* | 2/2013 | Schmudderich | .. | B60W 30/0956 |
| | | | | 701/96 |
| 2014/0358840 A1* | 12/2014 | Tadic | .................... | B60W 40/09 |
| | | | | 706/52 |
| 2016/0140872 A1* | 5/2016 | Palmer | ............... | G06K 9/00791 |
| | | | | 434/65 |
| 2017/0103269 A1* | 4/2017 | Heisele | .............. | G06K 9/00805 |
| 2017/0123428 A1* | 5/2017 | Levinson | ............. | G05D 1/0214 |
| 2017/0329332 A1* | 11/2017 | Pilarski | ................ | G05D 1/0088 |

OTHER PUBLICATIONS

Weiss, K. et al. "Target Modeling and Dynamic Classification for Adaptive Sensor Data Fusion", Proceedings IEEE Intelligent Vehicle Symposium, Jun. 9, 2003, pp. 132-137.
International Search Report and Written Opinion issued in corresponding International Application No. PCT/IB2017/055439 dated Feb. 7, 2018 (13 pp).

\* cited by examiner

OBJECT RECOGNITION AND CLASSIFICATION USING MULTIPLE SENSOR MODALITIES

TECHNICAL FIELD

This disclosure is generally related to object recognition and classification and, more specifically, to object recognition and classification based on data from multiple sensors and/or multiple levels of data in automated driving and assistance systems.

BACKGROUND

Many modern vehicles include advanced driver assistance systems (ADAS) to provide automated safety and/or assisted driving functionality. Many next generation vehicles will likely include autonomous driving (AD) systems to control and navigate the vehicles independent of human interaction. ADAS and AD systems often utilize object recognition and classification, which can include analyzing sensor data to identify detection events and known objects present in data. Machine learning techniques are commonly used for object recognition and classification. A machine learning unit can be trained to recognize a specific object or class of objects based on a set of training data representing the object or class of objects. It may, however, not be possible to learn every possible variation of a specific object that could be presented in sensor data.

There are situations that are not in the training set and are therefore unknown to the system. These are called corner cases. For example, a to-be-detected object could be viewed from a new angle, partially occluded by another object, dimly illuminated, and/or otherwise obscured. To properly detect such corner cases, a typical system may need to see a large amount of training data, which is often not computationally or otherwise practically feasible. Machine learning methods relying on large training sets may also be more complex, which can result in latency at run-time when a detection event or an object is classified.

One approach to overcome these inefficiencies is sensor fusion—the coordinated use of multiple sensors. Typical sensor fusion approaches are based on object-level fusion of sensor data, which applies object identification at an early stage and using one sensor type. Data from multiple sensors can be fused, but this is typically executed on object level data, which has already been processed to identify objects included therein. At this stage, much information has been removed. For example, a partially occluded object may not be included in the data because individual sensors may filter the object out as noise or a non-event.

SUMMARY

Object recognition and classification based on data from multiple sensor modalities is disclosed. A computing system can detect an event in a monitored portion of an environment coordinate field associated with a vehicle. The computing system can retrieve data associated with the detected event from a plurality of modalities. At least one of the modalities can include raw data from a sensor associated with the vehicle. The computing system can classify the detected event based at least in part on the retrieved data and one or more parameters of a classifier.

DETAILED DESCRIPTION

Disclosed herein are techniques for object recognition and classification for use in vehicles that include advanced driver assistance and autonomous driving systems. The object recognition and classification techniques disclosed herein can employ machine learning approaches. Many typical object classification approaches evaluate data from one sensor. Other typical approaches use one type of sensor data (e.g., Radar data) as a hint to assist classification on data from another sensor (e.g., raw image data). In contrast to these existing approaches, the object recognition and classification techniques disclosed herein classify objects based on data from multiple modalities, such as multiple sensors, multiple levels of sensor data, higher level data, tracked objects, objects from smart sensors, pre-processed data, and/or external data sources. Data from multiple modalities are provided as input to the machine learning algorithm at both machine learning training and classification. Because the machine learning unit is trained on data from multiple of modalities, less data from any one modality is needed to train the machine learning system. This reduces the amount of overall data ingested during training, thereby reducing computational overhead. Computational efficiency is also realized at classification when data from multiple modalities are input to the machine learning unit. As opposed to evaluating data from a single modality (e.g., just raw image data), evaluating data from multiple modalities may result in faster matches because multiple types of data (e.g., multiple types of sensor data, multiple levels of data, etc.) are evaluated. This benefit is particularly apparent in recognizing corner cases, such as occluded, dimly lit, or otherwise obscured objects. Thus, false negative detection events can be reduced and true positive detection events can also be increased relative to existing object recognition and classification approaches.

In some embodiments, further efficiency is realized by limiting object recognition and classification to triggered detection events. Processing based on triggered sensor events can further increase computational efficiency by limiting the amount of time the object recognition and classification functionality is active. As a result, the object recognition and classification techniques disclosed herein require less computational overhead, have reduced latency, and exhibit various other benefits relative to existing techniques. Thus, fewer heavy computing components need to be installed in a vehicle, and the processes of training and object recognition can be performed in much less time.

Sensor Fusion for Autonomous Driving

Figure 1:
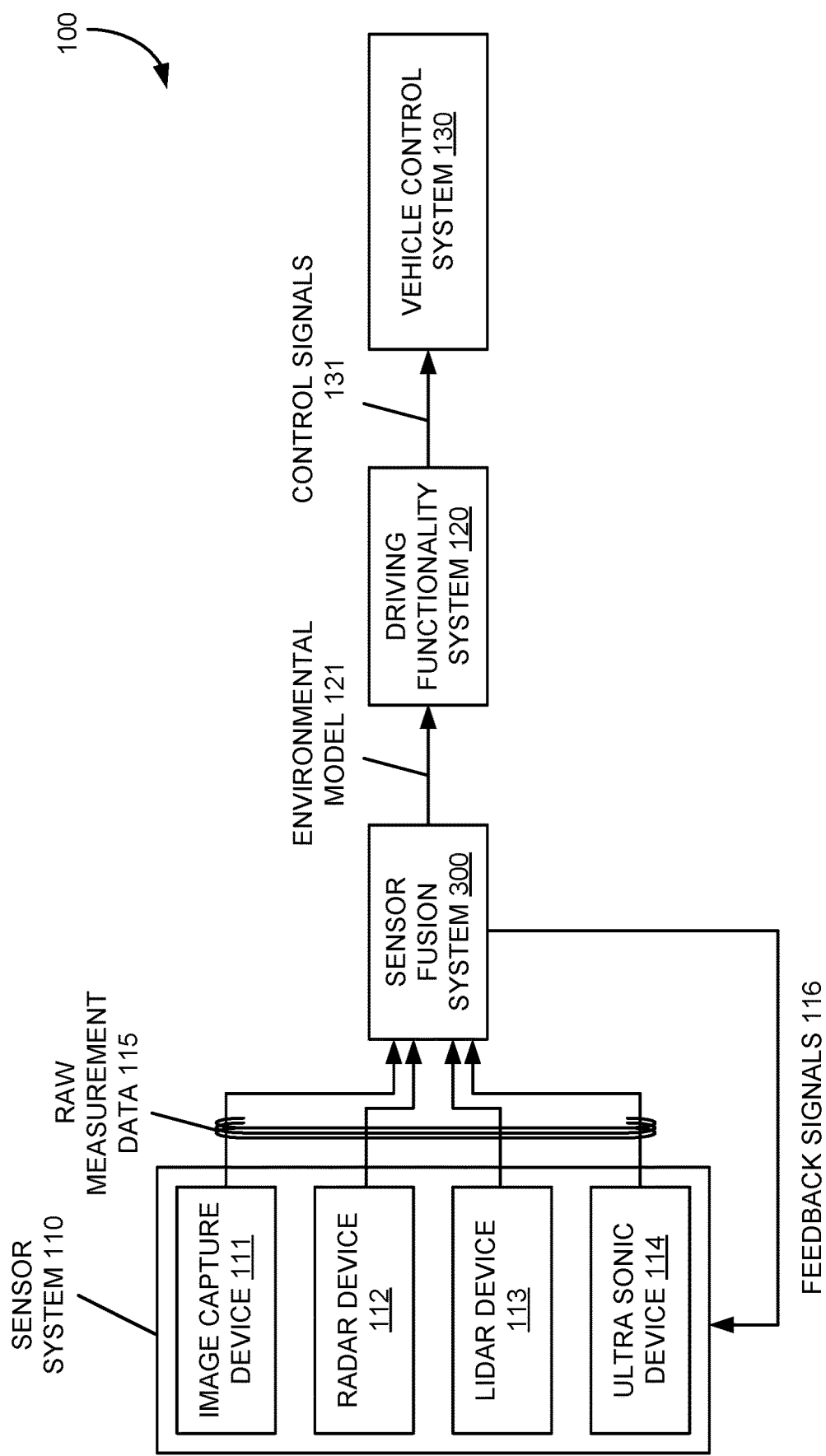
FIG. 1 illustrates an example autonomous driving system according to various embodiments.

FIG. 1 illustrates an example autonomous driving system 100 according to various embodiments. Referring to FIG. 1, the autonomous driving system 100, when installed in a vehicle, can sense an environment surrounding the vehicle and control operation of the vehicle based, at least in part, on the sensed environment.

The autonomous driving system 100 can include a sensor system 110 having multiple sensors, each of which can measure different portions of the environment surrounding the vehicle and output the measurements as raw measurement data 115. The raw measurement data 115 can include characteristics of light, electromagnetic waves, or sound captured by the sensors, such as an intensity or a frequency of the light, electromagnetic waves, or the sound, an angle of reception by the sensors, a time delay between a transmission and the corresponding reception of the light, electromagnetic waves, or the sound, a time of capture of the light, electromagnetic waves, or sound, or the like.

The sensor system 110 can include multiple different types of sensors, such as image capture devices 111, Radio Detection and Ranging (Radar) devices 112, Light Detection and Ranging (Lidar) devices 113, ultra-sonic devices 114, microphones, infrared or night-vision cameras, time-of-flight cameras, cameras capable of detecting and transmitting differences in pixel intensity, or the like. An image capture device 111, such as one or more cameras, can capture at least one image of at least a portion of the environment surrounding the vehicle. The image capture device 111 can output the captured image(s) as raw measurement data 115, which, in some embodiments, can be unprocessed and/or uncompressed pixel data corresponding to the captured image(s).

A radar device 112 can emit radio signals into the environment surrounding the vehicle. Since the emitted radio signals may reflect off of objects in the environment, the radar device 112 can detect the reflected radio signals incoming from the environment. The radar device 112 can measure the incoming radio signals, for example, measuring a signal strength of the radio signals, a reception angle, a frequency, or the like. The radar device 112 also can measure a time delay between an emission of a radio signal and a measurement of the incoming radio signals from the environment that corresponds to emitted radio signals reflected off of objects in the environment. The radar device 112 can output the measurements of the incoming radio signals as the raw measurement data 115.

A lidar device 113 can transmit light, such as from a laser or other optical transmission device, into the environment surrounding the vehicle. The transmitted light, in some embodiments, can be pulses of ultraviolet light, visible light, near infrared light, or the like. Since the transmitted light can reflect off of objects in the environment, the lidar device 113 can include a photo detector to measure light incoming from the environment. The lidar device 113 can measure the incoming light by, for example, measuring an intensity of the light, a wavelength, or the like. The lidar device 113 also can measure a time delay between a transmission of a light pulse and a measurement of the light incoming from the environment that corresponds to the transmitted light having reflected off of objects in the environment. The lidar device 113 can output the measurements of the incoming light and the time delay as the raw measurement data 115.

An ultra-sonic device 114 can emit acoustic pulses, for example, generated by transducers or the like, into the environment surrounding the vehicle. The ultra-sonic device 114 can detect ultra-sonic sound incoming from the environment, for example, the emitted acoustic pulses having been reflected off of objects in the environment. The ultra-sonic device 114 also can measure a time delay between emission of the acoustic pulses and reception of the ultra-sonic sound from the environment that corresponds to the emitted acoustic pulses having reflected off of objects in the environment. The ultra-sonic device 114 can output the measurements of the incoming ultra-sonic sound and the time delay as the raw measurement data 115.

Figure 2A:
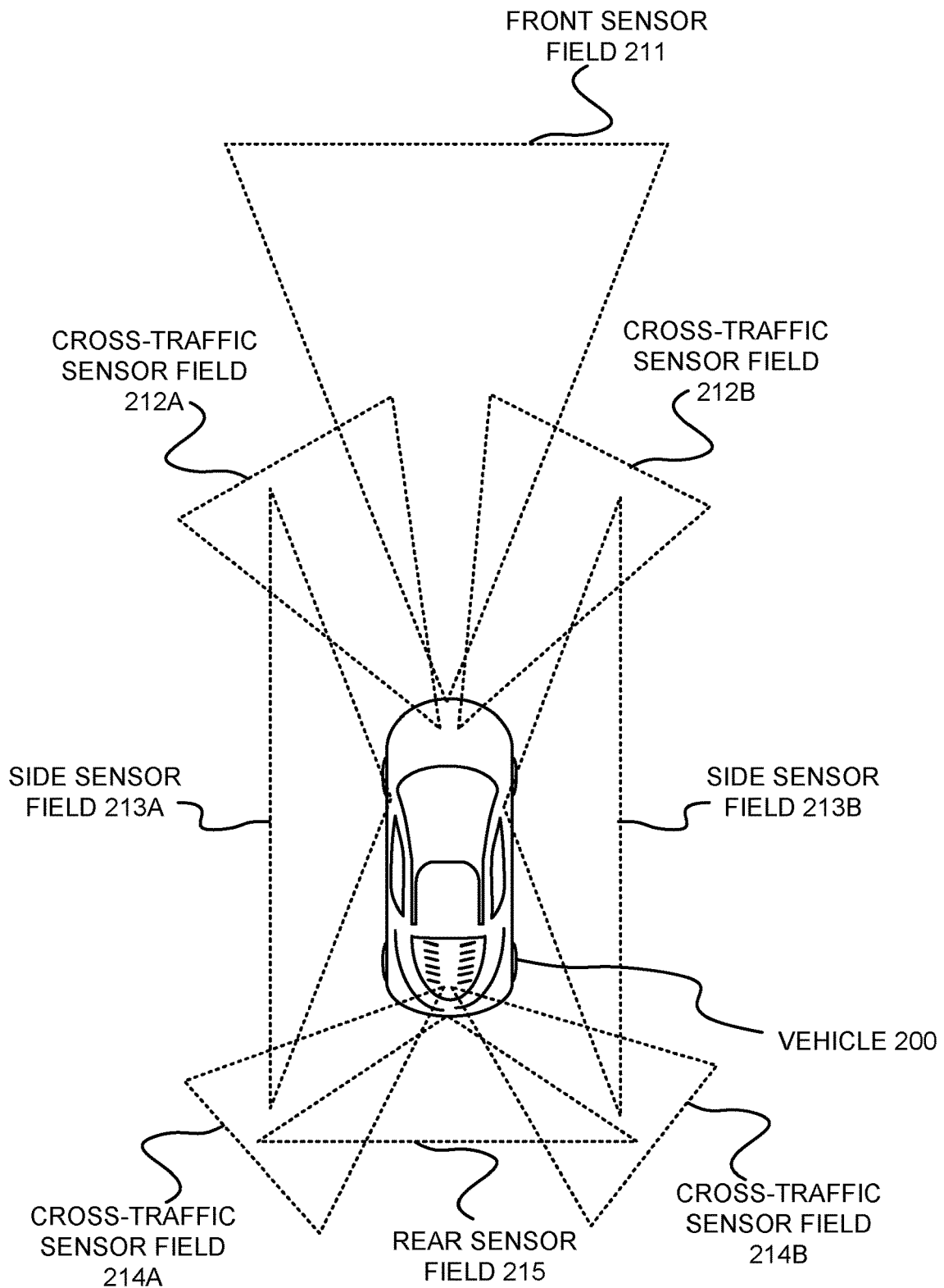
FIG. 2A illustrates example measurement coordinate fields for a sensor system deployed in a vehicle according to various embodiments.

The different sensors in the sensor system 110 can be mounted in the vehicle to capture measurements for different portions of the environment surrounding the vehicle. FIG. 2A illustrates example measurement coordinate fields for a sensor system deployed in a vehicle 200 according to various embodiments. Referring to FIG. 2A, the vehicle 200 can include multiple different sensors capable of detecting incoming signals, such as light signals, electromagnetic signals, and sound signals. Each of these different sensors can have a different field of view into an environment around the vehicle 200. These fields of view can allow the sensors to measure light and/or sound in different measurement coordinate fields.

The vehicle in this example includes several different measurement coordinate fields, including a front sensor field 211, multiple cross-traffic sensor fields 212A, 212B, 214A, and 214B, a pair of side sensor fields 213A and 213B, and a rear sensor field 215. Each of the measurement coordinate fields can be sensor-centric, meaning that the measurement coordinate fields can describe a coordinate region relative to a location of its corresponding sensor.

Referring back to FIG. 1, the autonomous driving system 100 can include a sensor fusion system 300 to receive the raw measurement data 115 from the sensor system 110 and populate an environmental model 121 associated with the vehicle with the raw measurement data 115. In some embodiments, the environmental model 121 can have an environmental coordinate field corresponding to a physical envelope surrounding the vehicle, and the sensor fusion system 300 can populate the environmental model 121 with the raw measurement data 115 based on the environmental coordinate field. In some embodiments, the environmental coordinate field can be a non-vehicle centric coordinate field, for example, a world coordinate system, a path-centric coordinate field, or the like.

Figure 2B:
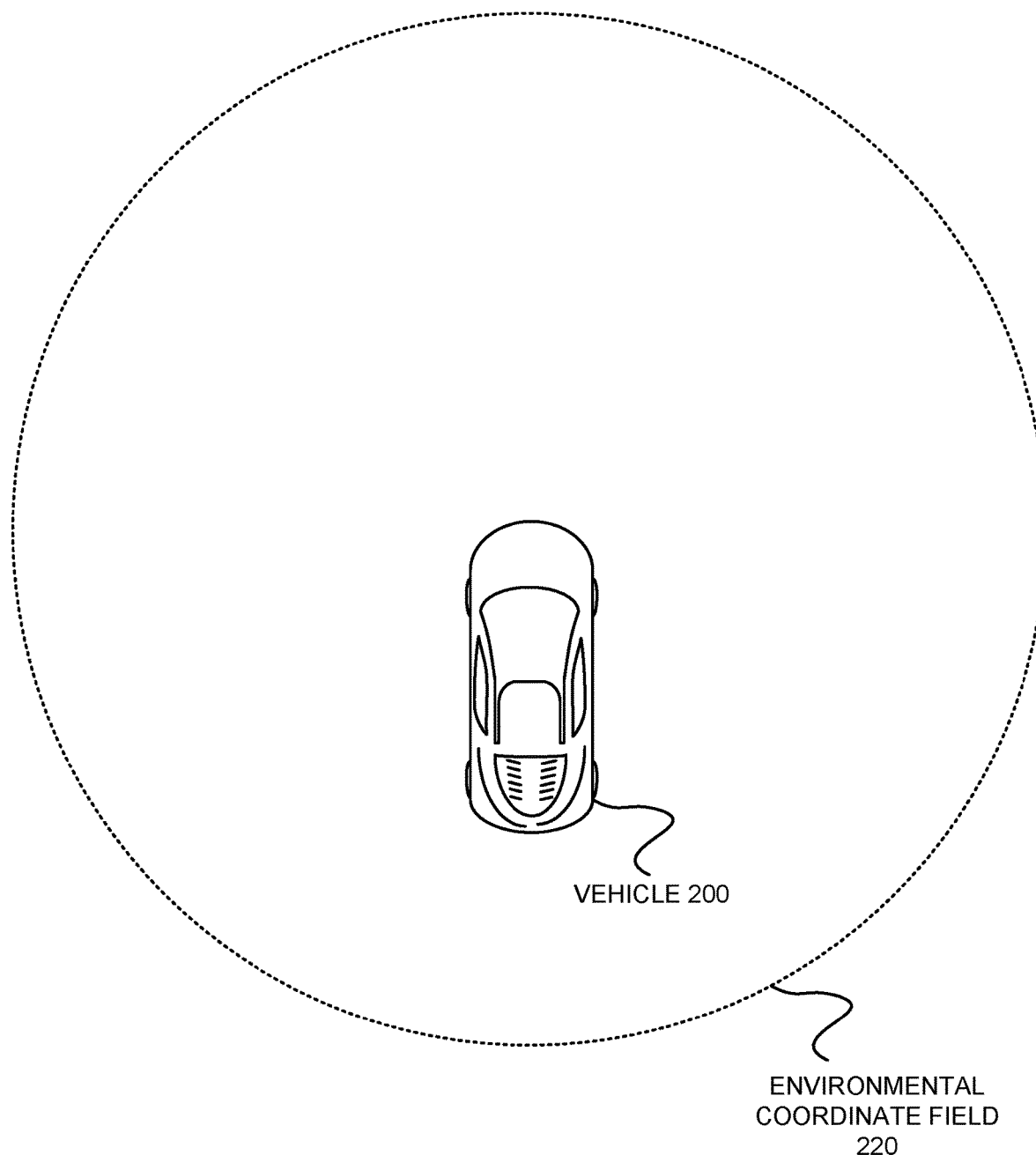
FIG. 2B illustrates an example environmental coordinate field associated with an environmental model for a vehicle according to various embodiments.

FIG. 2B illustrates an example environmental coordinate field 220 associated with an environmental model for the vehicle 200 according to various embodiments. Referring to FIG. 2B, an environment surrounding the vehicle 200 can correspond to the environmental coordinate field 220 for the environmental model. The environmental coordinate field 220 can be vehicle-centric and provide a 360 degree area around the vehicle 200. The environmental model can be populated and annotated with information detected by the sensor fusion system 300 or inputted from external sources. Embodiments will be described below in greater detail.

Referring back to FIG. 1, to populate the raw measurement data 115 into the environmental model 121 associated with the vehicle, the sensor fusion system 300 can spatially align the raw measurement data 115 to the environmental coordinate field of the environmental model 121. The sensor fusion system 300 also can identify when the sensors captured the raw measurement data 115, for example, by time stamping the raw measurement data 115 when received from the sensor system 110. The sensor fusion system 300 can populate the environmental model 121 with the time stamp or other time-of-capture information, which can be utilized to temporally align the raw measurement data 115 in the environmental model 121. In some embodiments, the sensor fusion system 300 can analyze the raw measurement data 115 from the multiple sensors as populated in the environmental model 121 to detect a sensor event or at least one object in the environmental coordinate field associated with the vehicle. The sensor event can include a sensor measurement event corresponding to a presence of the raw measurement data 115 in the environmental model 121, for example, above a noise threshold. The sensor event can include a sensor detection event corresponding to a spatial and/or temporal grouping of the raw measurement data 115 in the environmental model 121. The object can correspond to spatial grouping of the raw measurement data 115 having been tracked in the environmental model 121 over a period of time, allowing the sensor fusion system 300 to determine the raw measurement data 115 corresponds to an object around the vehicle. The sensor fusion system 300 can populate the environment model 121 with an indication of the detected sensor event or detected object and a confidence level of the detection. Embodiments of sensor fusion and sensor event detection or object detection will be described below in greater detail.

The sensor fusion system 300, in some embodiments, can generate feedback signals 116 to provide to the sensor system 110. The feedback signals 116 can be configured to prompt the sensor system 110 to calibrate one or more of its sensors. For example, the sensor system 110, in response to the feedback signals 116, can re-position at least one of its sensors, expand a field of view of at least one of its sensors, change a refresh rate or exposure time of at least one of its sensors, alter a mode of operation of at least one of its sensors, or the like.

The autonomous driving system 100 can include a driving functionality system 120 to receive at least a portion of the environmental model 121 from the sensor fusion system 300. The driving functionality system 120 can analyze the data included in the environmental model 121 to implement automated driving functionality or automated safety and assisted driving functionality for the vehicle. The driving functionality system 120 can generate control signals 131 based on the analysis of the environmental model 121.

The autonomous driving system 100 can include a vehicle control system 130 to receive the control signals 131 from the driving functionality system 120. The vehicle control system 130 can include mechanisms to control operation of the vehicle, for example by controlling different functions of the vehicle, such as braking, acceleration, steering, parking brake, transmission, user interfaces, warning systems, or the like, in response to the control signals.

Figure 3:
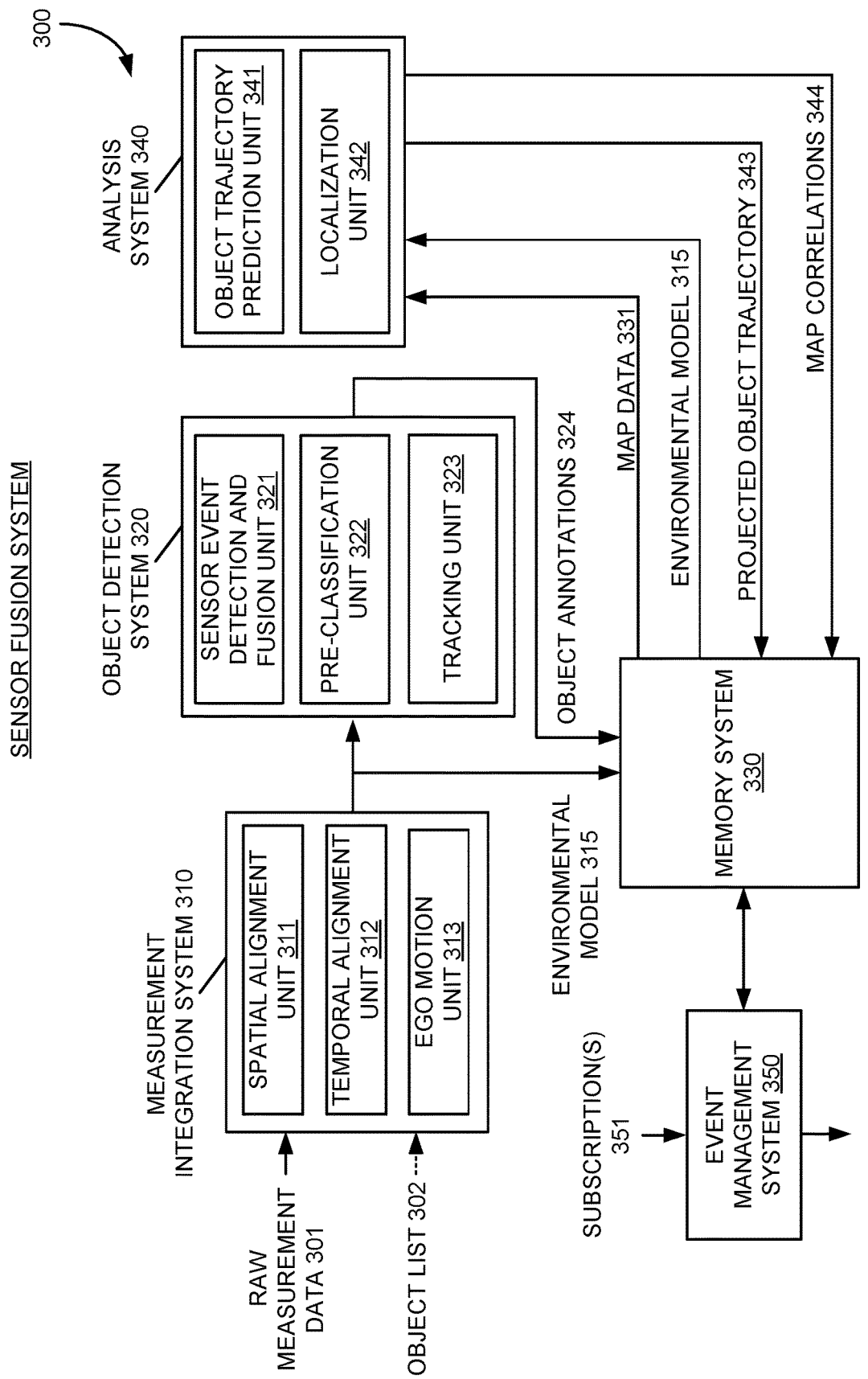
FIG. 3 illustrates an example sensor fusion system according to various examples.

FIG. 3 illustrates an example sensor fusion system 300 according to various examples. Referring to FIG. 3, the sensor fusion system 300 can include a measurement integration system 310 to receive raw measurement data 301 from multiple sensors mounted in a vehicle. The measurement integration system 310 can generate an environmental model 315 for the vehicle, which can be populated with the raw measurement data 301.

The measurement integration system 310 can include a spatial alignment unit 311 to correlate measurement coordinate fields of the sensors to an environmental coordinate field for the environmental model 315. The measurement integration system 310 can utilize this correlation to convert or translate locations for the raw measurement data 301 within the measurement coordinate fields into locations within the environmental coordinate field. The measurement integration system 310 can populate the environmental model 315 with the raw measurement data 301 based on the correlation between the measurement coordinate fields of the sensors to the environmental coordinate field for the environmental model 315.

The measurement integration system 310 also can temporally align the raw measurement data 301 from different sensors in the sensor system. In some embodiments, the measurement integration system 310 can include a temporal alignment unit 312 to assign time stamps to the raw measurement data 301 based on when the sensor captured the raw measurement data 301, when the raw measurement data 301 was received by the measurement integration system 310, or the like. In some embodiments, the temporal alignment unit 312 can convert a capture time of the raw measurement data 301 provided by the sensors into a time corresponding to the sensor fusion system 300. The measurement integration system 310 can annotate the raw measurement data 301 populated in the environmental model 315 with the time stamps for the raw measurement data 301. The time stamps for the raw measurement data 301 can be utilized by the sensor fusion system 300 to group the raw measurement data 301 in the environmental model 315 into different time periods or time slices. In some embodiments, a size or duration of the time periods or time slices can be based, at least in part, on a refresh rate of one or more sensors in the sensor system. For example, the sensor fusion system 300 can set a time slice to correspond to the sensor with a fastest rate of providing new raw measurement data 301 to the sensor fusion system 300.

The measurement integration system 310 can include an ego motion unit 313 to compensate for movement of at least one sensor capturing the raw measurement data 301, for example, due to the vehicle driving or moving in the environment. The ego motion unit 313 can estimate motion of the sensor capturing the raw measurement data 301, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment surrounding the vehicle.

The ego motion unit 313 can utilize the estimated motion of the sensor to modify the correlation between the measurement coordinate field of the sensor to the environmental coordinate field for the environmental model 315. This compensation of the correlation can allow the measurement integration system 310 to populate the environmental model 315 with the raw measurement data 301 at locations of the environmental coordinate field where the raw measurement data 301 was captured as opposed to the current location of the sensor at the end of its measurement capture.

In some embodiments, the measurement integration system 310 may receive objects or object lists 302 from a variety of sources. The measurement integration system 310 can receive the object list 302 from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The measurement integration system 310 also can receive the objects or an object list 302 from other systems internal to the vehicle, such as from a human machine interface, mapping systems, localization system, driving functionality system, vehicle control system, or the vehicle may be equipped with at least one sensor that outputs the object list 302 rather than the raw measurement data 301.

The measurement integration system 310 can receive the object list 302 and populate one or more objects from the object list 302 into the environmental model 315 along with the raw measurement data 301. The object list 302 may include one or more objects, a time stamp for each object, and optionally include a spatial metadata associated with a location of objects in the object list 302. For example, the object list 302 can include speed measurements for the vehicle, which may not include a spatial component to be stored in the object list 302 as the spatial metadata. When the object list 302 includes a confidence level associated with an object in the object list 302, the measurement integration system 310 also can annotate the environmental model 315 with the confidence level for the object from the object list 302.

The sensor fusion system 300 can include an analysis system 340 to develop information from the environmental model 315 for utilization by a driving functionality system which is providing input to a vehicle control system. The analysis system 340 can include an object trajectory prediction unit 341 to generate a projected object trajectory 343 of a tracked object proximate to the vehicle. The object trajectory prediction unit 341 can access the environmental model 315 and associated annotations from the memory system 330 or receive them directly from the measurement integration system 310 and/or the object detection system 320. The object trajectory prediction unit 341 can utilize the environmental model 315 along with the state change prediction model corresponding to the tracked object to predict movement of the tracked object relative to the vehicle in the future. Since a tracked object may have a multitude of options for moving in the future, in some embodiments, the object trajectory prediction unit 341 can generate a range of expected trajectories along with probabilities associated with the expected trajectories in the range. The object trajectory prediction unit 341 can annotate the environmental model 315 with the projected object trajectory 343, for example, by storing the projected object trajectory 343 in the environmental model 315 residing the in memory system 330.

The analysis system 340 can include a localization unit 342 to receive the environmental model 315 and map data 331, for example, from the memory system 330. The map data 331 can include topographical maps, terrain maps, street view maps, or the like, of an area corresponding to a location of the vehicle. The map data 331 can include features, such as roadways, signs, traffic signals, transit crossings, pedestrian crossings, buildings, trees, structures, terrain gradients, topographical edges, or like.

The localization system 342 can correlate data or annotations in the annotated environmental model 332 to landmarks or objects in the map data 331. In some embodiments, the localization system 342 can access the annotated environmental model 332 from the memory system 330 or receive them directly from the measurement integration system 310 and/or the object detection system 320. The correlation between the map data 331 and the annotated environmental model 332 can identify a vehicle location 344 describing a position of the vehicle relative to the map data 331. The localization system 342 can output the vehicle location 344, which, in some embodiments, can be stored by the memory system 330 as another annotation to the annotated environmental model 332. Embodiments of vehicle localization will be described in FIGS. 4 and 5 in greater detail.

The sensor fusion system 300 can include an event management system 350 to supply a vehicle control system with information corresponding to the environmental model 315 and its associated annotations. The event management system 350 can receive subscriptions 351 from one or more processes or components in a driving functionality system. Each of the subscriptions 351 may identify at least one region of interest (ROI) in the environmental coordinate field of the environmental model 315 for the sensor fusion system 300 to monitor for events, such as sensor measurement events, sensor detection events, fused sensor detection events, or the like, or to monitor for tracked objects or tracked object trajectory predictions. The regions of interest can correspond to portions of the environmental coordinate field associated with a particular driving or safety functionality. For example, a process or component interested in rear collision avoidance may provide the event management system 350 a subscription to a region of interest behind the vehicle.

The event management system 350 can monitor the memory system 330 for annotations to the environmental model 315 that correspond to events and/or receive indications of events directly from the object detection system 320. When the event management system 350 detects an event corresponding to a region of interest in a subscription 351, the event management system 350 can provide event data 352 to the processes or components subscribed to that region of interest. In some embodiments, the event data 352 can be a portion of the environmental model 315 and any of its annotations corresponding to the subscribed event and the region of interest.

The event management system 350 also can suggest dynamic changes to the subscriptions 351, for example, based on the mode of operation of the vehicle, a planned path or route the vehicle expects to traverse, features in map data 331, or the like. For example, the event management system 350 or other portion of the sensor fusion system 300 can identify locations of upcoming traffic lights or signage and suggest the process or component in the driving functionality system expand its region of interest or issue a subscription 351 to a new region of interest to include the upcoming traffic lights or signage. In another example, the event management system 350 or other portion of the sensor fusion system 300 can identify the vehicle plans to make a turn and suggest the process or component in the driving functionality system expand its region of interest to include areas corresponding to the road after making the turn.

Object Recognition and Classification Based on Multiple Sensor Modalities

Figure 4:
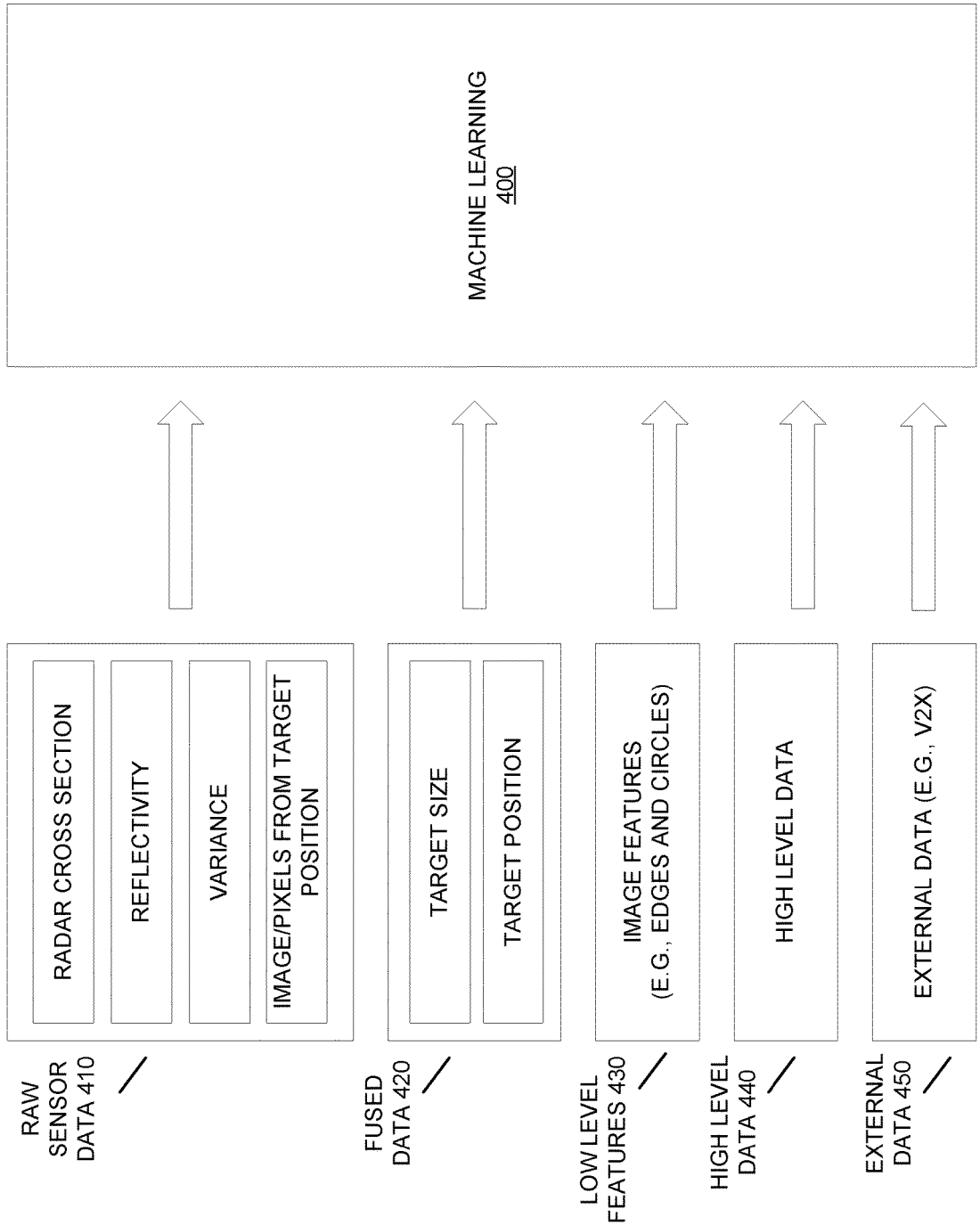
FIG. 4 illustrates an example block diagram for training an object recognition and classification unit according to various examples.

FIG. 4 illustrates an example block diagram for training an object recognition and classification unit according to various examples. The operations depicted in FIG. 4 may be performed in an object detection unit (e.g., object detection system 320 or pre-classification unit 322 of FIG. 3). In the example shown, features are provided as input to a machine learning unit 400. A machine learning unit 400 may include a machine learning method and/or algorithm executed on a system. The machine learning unit 400 may execute a neural network and/or any other suitable machine learning algorithm. The input features can be associated with a particular object or class of objects and can comprise a training set. The input features (training set) can be used to train the machine learning unit 400 to recognize and/or classify that object or class of objects. Input features can be any type of data from low level to high level data. Low level data may include, for example, sensor data that has not been processed or that has been minimally processed, such as raw sensor data. Higher level data may include target size and positions of objects, image features (such as edges, circles, lines, and the like), and the like. High level data may include sensor data that has been processed, filtered, compressed, classified, or otherwise processed. Data from certain external sources, such as V2X data, may include high level data. The input features to the machine learning unit 400 can include, for example, raw data 410, fused data 420, low level features 430, high level data 440, external data 450, and/or other types of data related to an object or class of objects.

Raw data 410 may include unprocessed data collected by, corresponding to, or associated with a sensor. Raw data 410 may include raw image data from an image capture device (such as one or more cameras) including unprocessed and/or uncompressed pixel data, image variance data, and/or any other image data. Raw data 410 may include Radar data, such as radio signals, the signal strength of radio signals, a reception angle of a signal, a frequency, a Radar cross-section, or other data associated with a detection event that is collected by a Radar device. Raw data 410 may include Lidar raw data, such as reflectivity of incoming light, intensity of incoming light, a wavelength of incoming light, a time delay between outpulse of light and measured incoming light, and/or other data associated with a detection event as typically measured by a Lidar device. Raw data 410 can include data measured by an ultrasonic device, such as ultra-sonic sound and time delay associated with a detection event. Raw data 410 may include any data associated with a detection event, including any data collected by a sensor measuring the detection event.

Fused data 420 can include processed data collected from and/or that could be collected from one or more sensors. Fused data 420 may include a target size associated with an object, a target position of an object, and/or other data representing an object. The target size of the object may be represented by, for example, filtered image pixel data, radar cross-section data, reflectivity, and/or other processed data. The target size of an object may define it geometry, shape, or other physical attributes. For example, the target size of a pedestrian may include data representing the height, width, and/or overall shape of pedestrian. Fused data 420 may include a target position of an object. The target position of an object may represent the location of an object relative to a sensor or other objects (such as a vehicle).

Low level features 430 can include processed image data. For example, image data associated with an object may be filtered to include lines, edges, shapes, and other geometric features of an image. Image feature data of a pedestrian may include lines, edges or geometric shape that typically resemble person.

High level data 440 may include smart sensor object-level data, preprocessed data, tracked objects, and/or other processed data. Smart sensor object-level data can include data that is related to the attributes of an object that has been classified by one or multiple sensors. A tracked object can include attributes an object that has been classified, including, for example, the past and predicted trajectory of the tracked object.

External data 450 can include data from external sources, such as V2X data sources, the Internet, servers associated with an autonomous driving platform, and/or any other source. In one example, data from a V2X data source may include the location, appearance, and/or trajectory of another vehicle as reported by that vehicle over a vehicle-to-vehicle communication system.

In various embodiments, raw sensor data 410, fused data 420, low level features 430, high level data 440, external data 450, and/or other types of data, are used to train the machine learning unit 400 to classify a detection event and/or an object.

In one example, the machine learning unit 400 is trained to identify pedestrians. Input features associated with a pedestrian including multiple levels of data from multiple types of sensors are input to the model. Raw data 410 including radar cross sections of various pedestrians, reflectivity data associated with various pedestrians, raw image data representing various pedestrians, and/or other raw data are provided to the machine learning unit 400. Fused data 420 from multiple sensors that is indicative of the size of the pedestrian, positions of the pedestrian relative to the vehicle, range of speed associated with a pedestrian, and/or other attributes of a pedestrian are provided to the machine learning unit 400. Low level features 430 representing typical geometric shapes associated with a pedestrian are input to the machine learning unit 400. High level data 440 including object level data representing one or more pedestrians are input to the machine learning unit 400. External data 450 including V2X data and/or other external data are provided to the machine learning unit 400. The input features are used to train the machine learning system 400 to identify a pedestrian. During training, various classifier parameters are generated and continuously updated. A subset of a classifier's parameters can be called a fingerprint of a specific object class if this parameter subset has high relevance for the correct classification of that object class. Such subsets of a classifier's parameters may not necessarily be uniquely assigned to a specific object class, meaning that certain parameters can be a part of multiple fingerprints. The resulting classifier parameters can, for example, represent the properties of a pedestrian and these parameters can be influenced by, for example, a radar cross section, lidar reflectivity, raw image data, size, speed measurement, head appearance, arm appearance, torso appearance.

In various embodiments, state of the art training methods can be used to train the machine learning unit. The machine learning unit is trained on data associated with multiple modalities, and during training, classifier parameters, such as a fingerprint associated with an object, are generated. The classifier parameters are stored, and the classifier parameters can be used to classify multi-modality data associated with a detection event. As discussed below, a fingerprint generated on the basis of multi-sensor multi-level data may be useful for identifying a pedestrian that is viewed from a new angle, a pedestrian that is partially obscured by another object, or another corner case presentation of a pedestrian. For example, a camera image of an occluded pedestrian may not match an image fingerprint of a pedestrian, but a contemporaneously collected multi-sensor multi-level data of the occluded pedestrian may result in a positive recognition.

Figure 5:
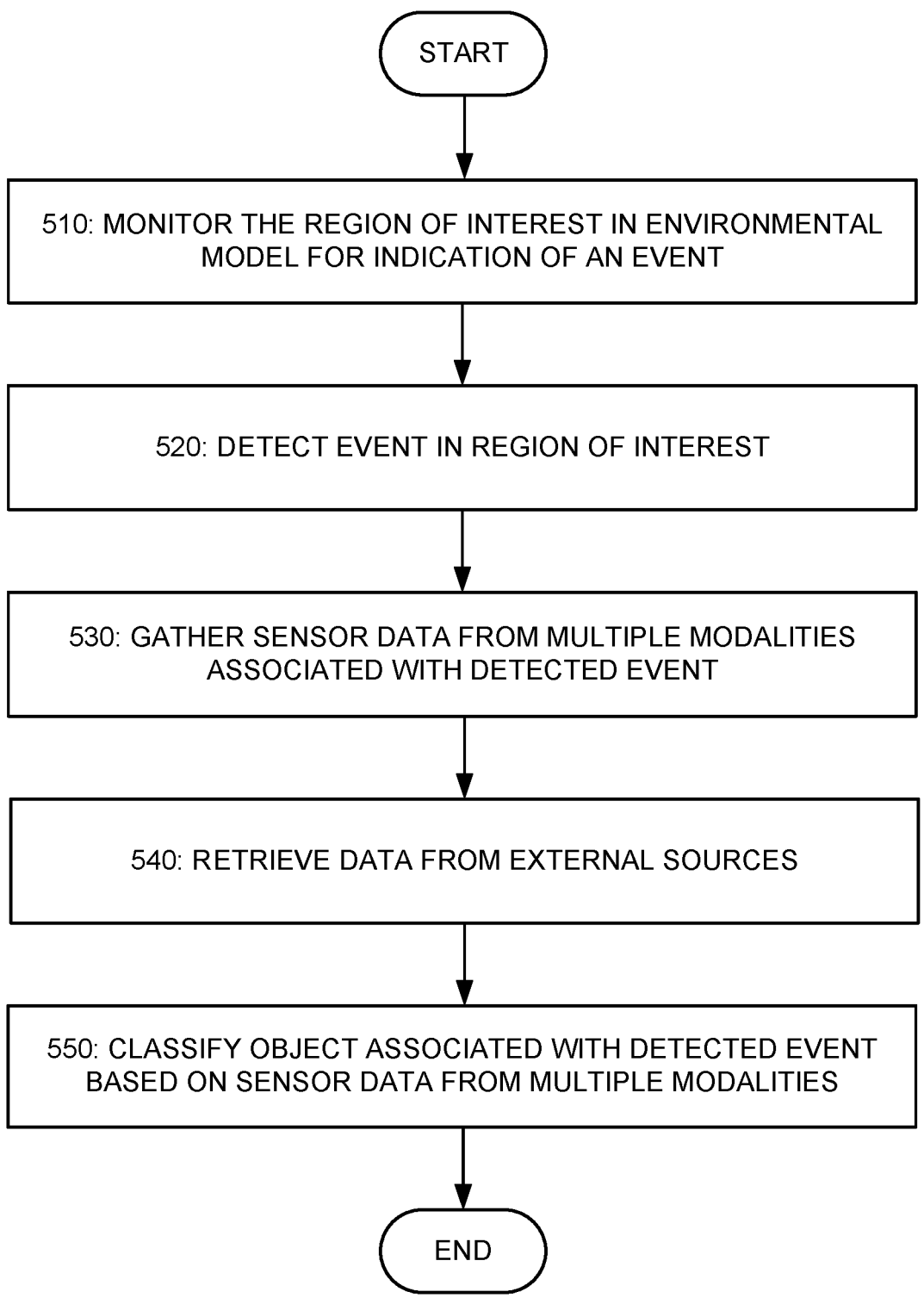
FIG. 5 illustrates an example flowchart for classifying objects according to various examples.

FIG. 5 illustrates an example flowchart for classifying objects according to various examples. The operations depicted in FIG. 5 may be performed in an object detection unit (e.g., object detection system 320 or pre-classification unit 322 of FIG. 3). Referring to FIG. 5, in a block 510, a region of interest in an environmental model can be monitored for an indication of an event. A region of interest can include a portion of the environmental model defined through its spatial and temporal description. A region of interest can have a geometric description which can be stored as a pre-defined two dimensional or three dimensional geometric shape/volume, a shape or volume defined by formulas, a parameterization of a geometric primitive (such as a cone or rectangle) or a combination thereof. The region of interest can correspond to a portion of an environmental coordinate field in the environmental model associated with a particular driving or safety functionality. Certain autonomous driving systems may only use data gathered in a certain region of the environmental model. For example, a forward braking assistant may only use data concerning the region of the environmental model that is in front of the vehicle. In some cases, the region of interest can be adjusted based on a driving context. For example, a driving functionality system, such as an AD/ADAS service, may subscribe to a larger region of interest (including sidewalks, pedestrians, cross streets, etc.) when in a city driving context than when in a highway driving context.

According to various embodiments, an AD/ADAS service subscribes to particular region(s) of interest. For example, an automatic braking assist feature may subscribe to a region in front of the vehicle, while a lane change warning system may subscribe to regions interest adjacent to the vehicle. In certain cases, there can be various levels of subscription to regions of interest. An AD/ADAS service can subscribe to all events happening in the region of interest, or an AD/ADAS service can subscribe to a subset of events. The subset of events may include information already present in the region of interest; select events including, for example, sensor measurement events, sensor detection events, and the like; relevant hints from other AD/ADAS services and other system components; and/or other combinations of events.

In some embodiments, the computing system can monitor a memory system storing the environmental model for updates to the environmental model or may receive updates directly from a sensor fusion device. In certain cases, only the region of interest is monitored, which can reduce the computing resources dedicated to object recognition.

In a block 520, the computing system can detect an event in response to the monitoring of the region of interest in the environmental model. In some embodiments, the event may be a sensor measurement event, which can correspond to raw measurement data from a sensor populated into the region of interest in the environmental model. The event also may be a sensor detection event or a fused sensor detection event. The event may also correspond to a detection of an object, which may have been annotated into the environmental model. The event may also correspond to a detection of a projected trajectory entering the region of interest, which may have been annotated into the environmental model. In the context of a forward braking assist feature, a detected event may include the observed presence of a partially obscured object. The partially obscured object may include a pedestrian behind a tree, and the system may not at this stage classify the pedestrian. Rather, the system may just determine that an event has occurred, such as a fused sensor detection event, and may associate an unclassified object with the detection event.

In a block 530, the computing system can gather sensor data from multiple modalities associated with the detected event. In some cases, sensor data can be gathered from any sensors collecting data in a region of interest around the time of the detected event. The sensor data may include raw sensor data, such as image pixel data from an image capture device, radar cross section data, radar reflection data, lidar reflectivity data, raw ultrasonic data, a spectral image of the region of interest, and/or other raw sensor relevant to the detected object. The sensor data may include higher level data from various sensors, such as object-level data, fused sensor data, and/or other higher level data relevant to the detected object. Data from multiple modalities, such as multiple sensors and multiple levels of data, are gathered on an event basis. By gathering data on an event basis from a particular region of interest rather than at all times in all portions of the environmental model, significant computing resources can be conserved and latency reduced.

In certain cases, the computing system may access an annotated environmental model stored in the memory system, and extract data from the environmental model corresponding to the region of interest. The data from the environmental model corresponding to the region of interest can include multiple levels of data collected from and processed by multiple sensors associated with the vehicle. In some embodiments, the environmental model may include data corresponding to multiple different time periods or time slices, so the computing system can retrieve the data corresponding to the one or more time slices relative to the detected event.

In a block 540, the computing system can retrieve data from external sources. Data related to the detected event may be retrieved from external sources such as V2X communications, other AD/ADAS services, a map database, the Internet, and/or other external sources. In certain cases, this step may be optional.

Figure 6:
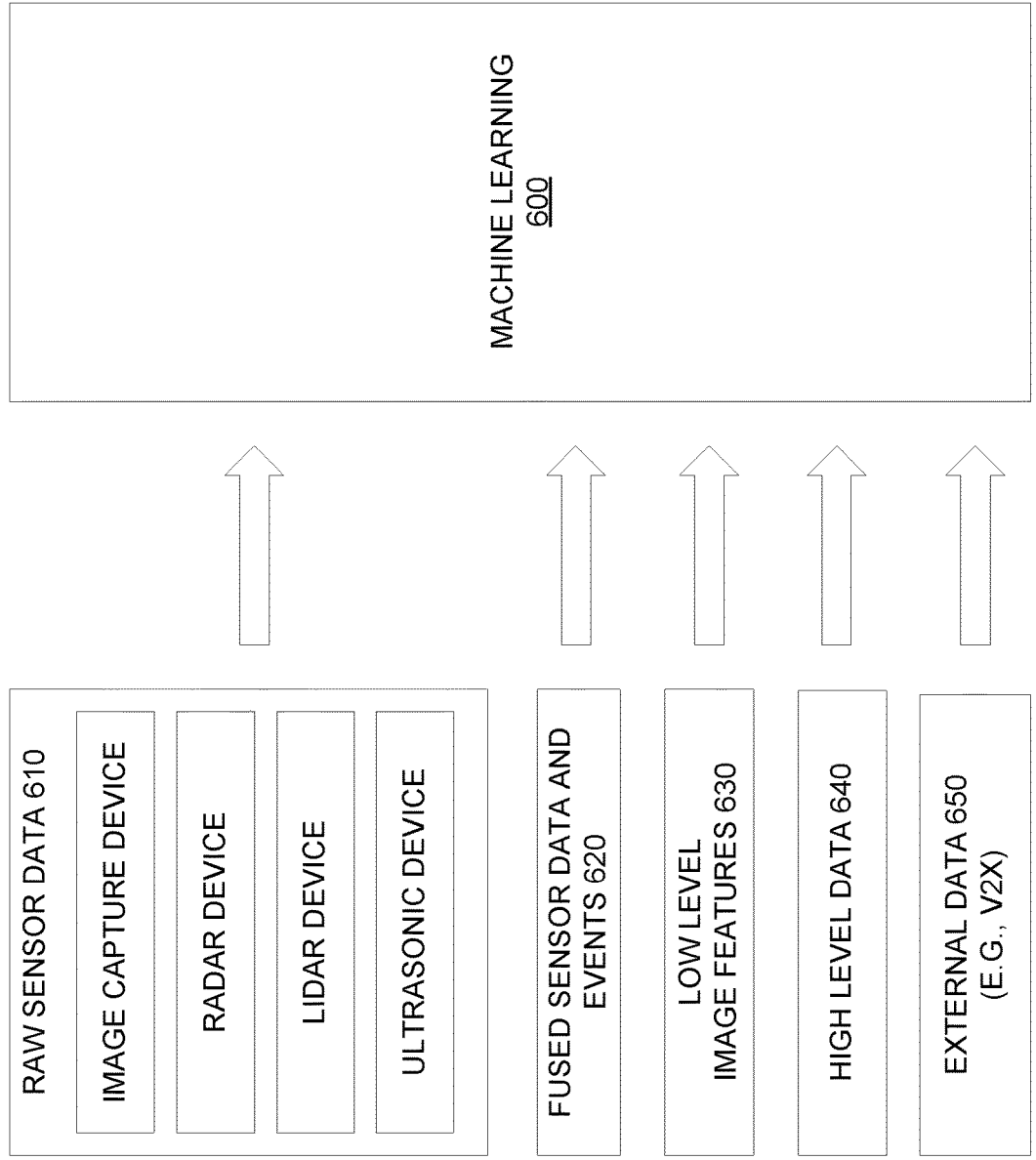
FIG. 6 illustrates an example block diagram for object recognition and classification according to various examples.

In a block 550, an object associated with the detected event is classified or pre-classified based on the sensor data from multiple modalities and/or data from external sources. A machine learning approach, such as neural network machine learning, can be used to classify or pre-classify an object associated with the detected event using sensor data from multiple modalities. In certain cases, multiple levels of data from multiple sensors or from sensor fusion blocks can be provided to the machine learning unit. Data relevant to an object from external sources may also be provided to the machine learning unit. The machine learning system may process the data from multiple modalities to recognize or classify an object associated with the detected event FIG. 6 illustrates an example block diagram for object recognition and classification according to various examples. Data from sensor modalities and/or external data sources are provided to a machine learning unit 600 (e.g., a system executing a machine learning algorithm or method). The machine learning unit 600 uses the data to recognize and/or classify an object. Data from or associated with sensor modalities (e.g., multi-level and multi-sensor data) may include, for example, raw sensor data 610, fused data 620, low level image features 630, high level data 640, data from external sources 650, and/or other relevant data. The raw sensor data 610 may include, for example, raw image data (e.g., pixels) from an image capture device, raw Radar reflection data, raw Lidar reflectivity data, raw ultrasonic data, high frequency analog data, and/or other raw data collected by a sensor on a vehicle. As described in detail herein, fused sensor data and/or events 620 may include a combination of data, such as raw sensor data, object-level data, and/or other data, from multiple sensors. The fused sensor data and/or events 620 may relate to, for example, a detection event and/or a region of interest. Low level image features 630 may include edges, shapes, and the like identified or extracted from a camera image. The low level image features 630 may be generated by an event detection and fusion unit and/or other processing unit based on image data collected by image capture device. High level data 640 may include smart sensor object-level data, preprocessed data, tracked objects, and/or other processed data. External data 650 can include data from external sources such as V2X communications, sensors or systems in other vehicles, map databases, objects tracked by other AD/ADAS services, and/or any other external data.

In various embodiments, sensor data provided to the machine learning unit 600 is limited to a region of interest and/or detected event in the region of interest. In certain cases, data is gathered from region(s) of interest in an environmental based on detected event as described, for example, in the process of FIG. 5. A region of interest management unit 650 can manage monitoring of various region(s) of interest. The managed regions of interest can include regions of interest to which a particular AD/ADAS service has subscribed. When an event is detected in a monitored region of interest, data related to the event is gathered and provided to the machine learning unit 600. For example, raw sensor data 610, fused data 620, low level image features 630, high level data 640, data from external sources 650, and/or other data from the region of interest in an environmental model is provided to the machine learning unit 600. The raw sensor data 610, fused data 620, low level image features 630, high level data 640, data from external sources 650, and/or other data can be related to a detected event in the region of interest. As a result, data can be provided the machine learning unit 600 on an event basis.

The machine learning unit 600 can use the raw sensor data 610, fused data 620, low level image features 630, high level data 640, data from external sources 650, and/or other data related to a detected event to classify or recognize an object or class of objects associated with the event. Using the techniques described in relation to FIGS. 4 and 5, a previously generated object fingerprint can be utilized to recognize an object or class of objects associated with the event.

By way of example, an event is detected in region of interest, for example, in front a vehicle. The detected event may include image data resembling a partially occluded circle. Based on the detected event, sensor data from multiple modalities in the region of interest around the time of the event are provided to the machine learning unit 600. The data can include raw sensor data 610, such as raw image data including pixels resembling a portion of circle, radar cross section data resembling a street sign, and lidar reflection data indicating the object is metal, fused sensor data 620, image features 630, high level data 640, and/or other relevant data. The data from multiple modalities (e.g., raw sensor data 610, fused sensor data 620, and low level image features 630, high level data 640, and the like) and the learned parameters included in the object fingerprints are used by the machine learning unit 600 in order to classify the object as a street sign.

In existing systems, data from one sensor modality, such as raw image data, or one source of data would be processed. In that case, the machine learning unit 600 may not have been successful in identifying the partially occluded street sign because captured image of the street sign would not include enough of the street sign geometry corresponding to the image data used during training to produce the object fingerprint.

Figure 7:
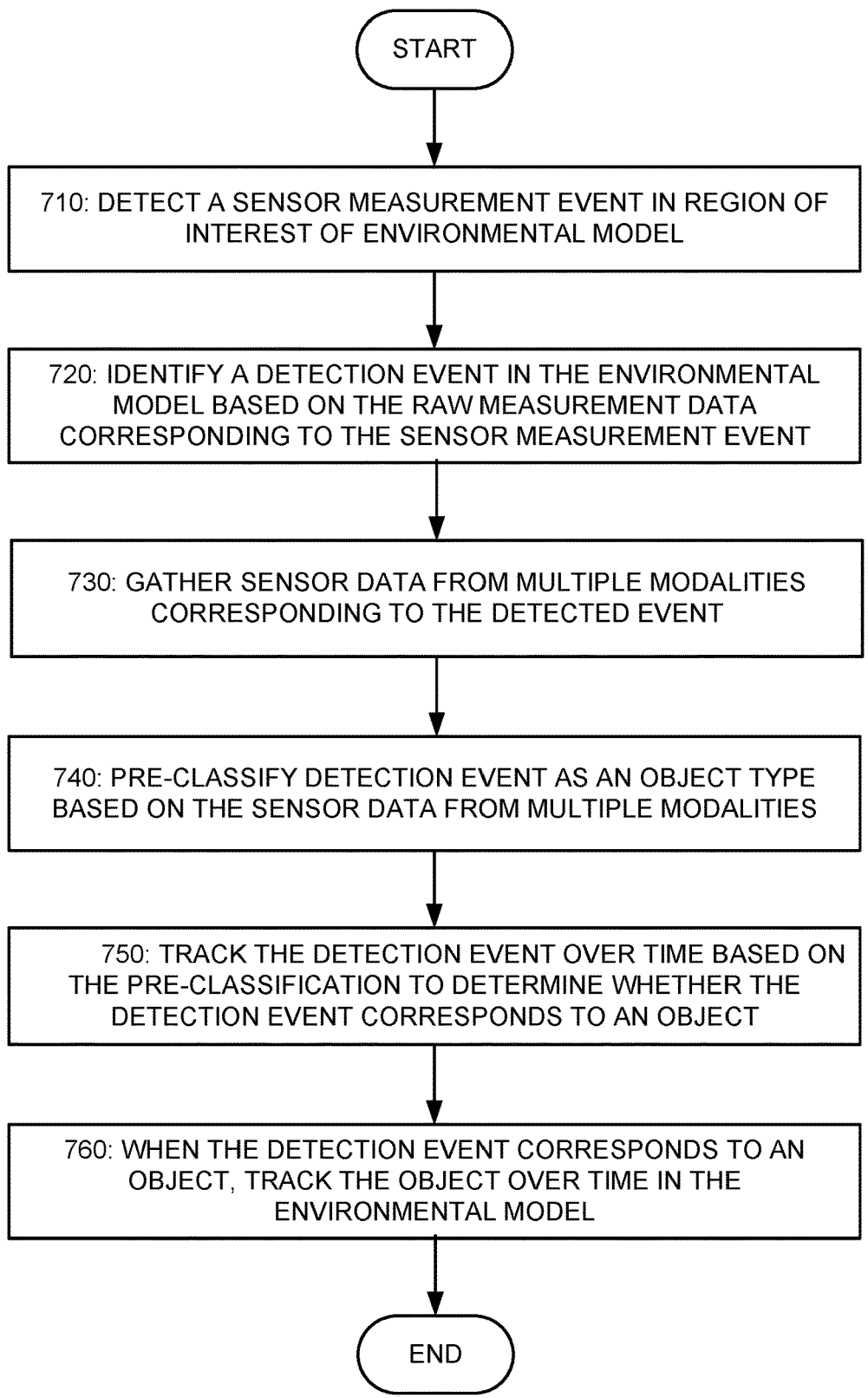
FIG. 7 illustrates an example flowchart for object tracking based on sensor data from multiple modalities according to various examples.

FIG. 7 illustrates an example flowchart for object tracking based on sensor data from multiple modalities according to various examples. The operations depicted in FIG. 7 may be performed in a pre-classification unit, such as pre-classification unit 322 of FIG. 3. Referring to FIG. 7, in a block 710, a computing system implementing object tracking can detect a sensor measurement event in at least a portion of an environmental model with raw measurement data. The sensor measurement event can identify locations in the environmental model having been populated with the raw measurement data, for example, above a noise threshold. In some embodiments, the computing system can detect the sensor measurement event by identifying changes in intensity within the raw radar measurement data over time, changes in lidar reflectivity data over time, change in pixel values, or the like.

In a block 720, the computing system implementing object tracking can identify a detection event, such as a sensor detection event or a fused sensor detection event in the environmental model based on the raw measurement data corresponding to the sensor measurement event. The computing system can analyze the raw measurement data in the environmental model at the locations associated with the sensor measurement event to detect the sensor detection event or the fused sensor detection event.

In a block 730, the computing system can gather sensor data associated with the detected event from multiple modalities. In some cases, sensor data can be gathered from any sensors collecting data in the region of interest around the time of the detected event. The sensor data may include raw sensor data, such as image pixel data from an image capture device, radar cross section data, radar reflection data, lidar reflectivity data, raw ultrasonic data, a spectral image of the region of interest, and/or other raw sensor relevant to the detected object. The sensor data may include higher level data from various sensors, such as object-level data, fused sensor data, and/or other higher level data relevant to the detected object. In certain cases, data is gathered from external sources, such as V2X communications, map data sources, other AD/ADAS systems, or the like.

In a block 740, the computing system implementing object tracking can pre-classify the detection event as an object type based on the sensor data from multiple modalities and and/or external data sources. A machine learning approach, such as neural network machine learning, can be used to pre-classify an object associated with the detected event. The machine learning system may process the data from multiple modalities and/or external sources to recognize or classify an object associated with the detected event.

Using the object recognition and classification techniques described with reference to FIGS. 5 and 6, data from multiple sensor modalities are given as an input to a machine learning unit containing one or more object fingerprints. In the event the gathered data is classified to be of a specific object class (within, for example, a certain level of confidence), it may be determined the gathered data corresponds to the object class. The detection event may be classified as that object type.

In some embodiments, the object type in the pre-classification can correspond to another vehicle, a pedestrian, a cyclist, an animal, a static object, or the like. The computing system can annotate the environmental model with the sensor detection event, the fused sensor detection event, and/or the assigned pre-classification of the detection event.

In a block 750, the computing system implementing object tracking can track the detection event over time based on the pre-classification to determine whether the detection event corresponds to an object. In some embodiments, the computing system can track the sensor detection event and/or the fused sensor detection event utilizing at least one state change prediction model, which can predict dynamic movement of the sensor event over time. The computing system can select the state change prediction model to utilize to track the sensor detection event and/or the fused sensor detection event based on the assigned pre-classification of the detection event.

In various embodiments, sensor data from multiple modalities and/or external sources may be collected over time as the object is tracked. This collected data may be continuously provided and/or provided at intervals to a machine learning unit. And the collected data may be provided as input to the machine learning unit which performs classification, to increase a confidence that the pre-classified tracked object is in fact that object.

In a block 760, when the detection event corresponds to an object, the computing system implementing object tracking can track the object over time in the environmental model. The computing system can annotate the environmental model to indicate the presence of the object corresponding to the detection event. The computing system can track the detected object by analyzing the environmental model when updated over time with additional raw measurement data.

Illustrative Operating Environment

The execution of object recognition and classification techniques according to embodiments may be implemented using computer-executable software instructions executed by one or more programmable computing devices. Because these embodiments may be implemented using software instructions, the components and operation of a programmable computer system on which various embodiments may be employed will be described below.

Figure 8:
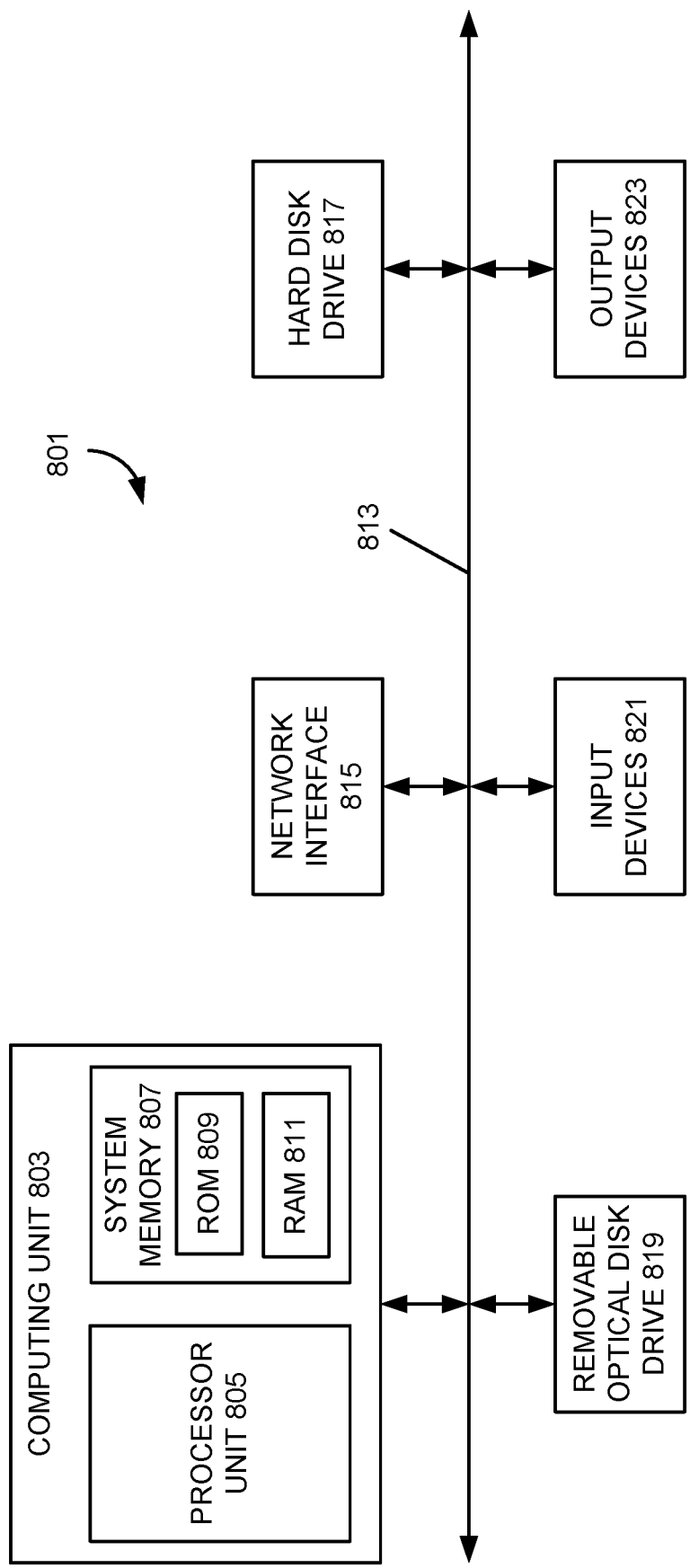
FIGS. 8 and 9 illustrate an example of a computer system of the type that may be used to implement various embodiments.
Figure 9:
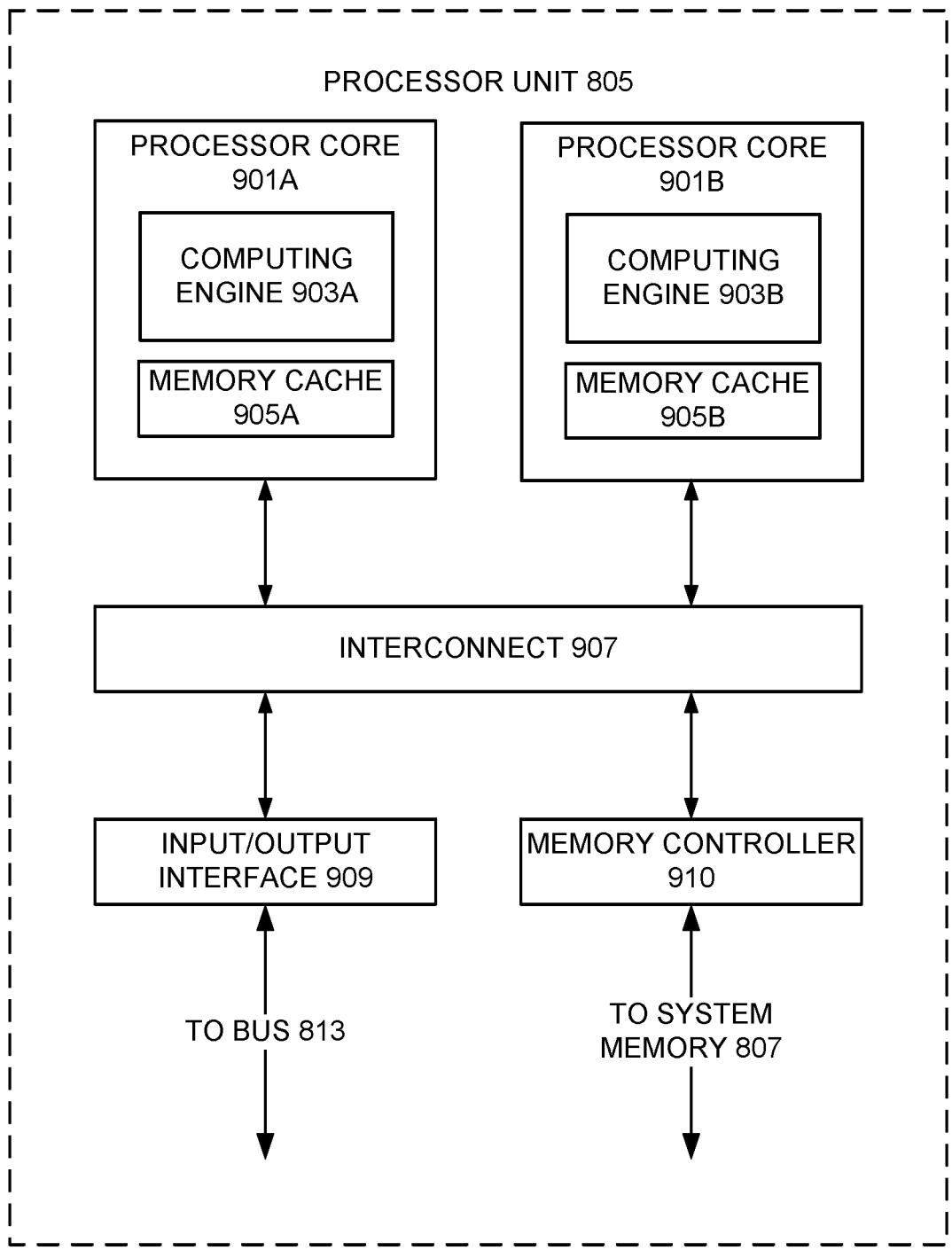

FIGS. 8 and 9 illustrate an example of a computer system of the type that may be used to implement various embodiments. Referring to FIG. 8, various examples may be implemented through the execution of software instructions by a computing device 801, such as a programmable computer. Accordingly, FIG. 8 shows an illustrative example of a computing device 801. As seen in FIG. 8, the computing device 801 includes a computing unit 803 with a processing unit 805 and a system memory 807. The processing unit 805 may be any type of programmable electronic device for executing software instructions, but will conventionally be a microprocessor. The system memory 807 may include both a read-only memory (ROM) 809 and a random access memory (RAM) 811. As will be appreciated by those of ordinary skill in the art, both the read-only memory (ROM) 809 and the random access memory (RAM) 811 may store software instructions for execution by the processing unit 805.

The processing unit 805 and the system memory 807 are connected, either directly or indirectly, through a bus 813 or alternate communication structure, to one or more peripheral devices 817-823. For example, the processing unit 805 or the system memory 807 may be directly or indirectly connected to one or more additional memory storage devices, such as a hard disk drive 817, which can be magnetic and/or removable, a removable optical disk drive 819, and/or a flash memory card. The processing unit 805 and the system memory 807 also may be directly or indirectly connected to one or more input devices 821 and one or more output devices 823. The input devices 821 may include, for example, a keyboard, a pointing device (such as a mouse, touchpad, stylus, trackball, or joystick), a scanner, a camera, and a microphone. The output devices 823 may include, for example, a monitor display, a printer and speakers. With various examples of the computing device 801, one or more of the peripheral devices 817-823 may be internally housed with the computing unit 803. Alternately, one or more of the peripheral devices 817-823 may be external to the housing for the computing unit 803 and connected to the bus 813 through, for example, a Universal Serial Bus (USB) connection.

With some implementations, the computing unit 803 may be directly or indirectly connected to a network interface 815 for communicating with other devices making up a network. The network interface 815 can translate data and control signals from the computing unit 803 into network messages according to one or more communication protocols, such as the transmission control protocol (TCP) and the Internet protocol (IP). Also, the network interface 815 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 801 is illustrated as an example only, and it not intended to be limiting. Various embodiments may be implemented using one or more computing devices that include the components of the computing device 801 illustrated in FIG. 8, which include only a subset of the components illustrated in FIG. 8, or which include an alternate combination of components, including components that are not shown in FIG. 8. For example, various embodiments may be implemented using a multi-processor computer, a plurality of single and/or multiprocessor computers arranged into a network, or some combination of both.

With some implementations, the processor unit 805 can have more than one processor core. Accordingly, FIG. 9 illustrates an example of a multi-core processor unit 805 that may be employed with various embodiments. As seen in this figure, the processor unit 805 includes a plurality of processor cores 901A and 901B. Each processor core 901A and 901B includes a computing engine 903A and 903B, respectively, and a memory cache 905A and 905B, respectively. As known to those of ordinary skill in the art, a computing engine 903A and 903B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 903A and 903B may then use its corresponding memory cache 905A and 905B, respectively, to quickly store and retrieve data and/or instructions for execution.

Each processor core 901A and 901B is connected to an interconnect 907. The particular construction of the interconnect 907 may vary depending upon the architecture of the processor unit 805. With some processor cores 901A and 901B, such as the Cell microprocessor created by Sony Corporation, Toshiba Corporation and IBM Corporation, the interconnect 907 may be implemented as an interconnect bus. With other processor units 901A and 901B, however, such as the Opteron™ and Athlon™ dual-core processors available from Advanced Micro Devices of Sunnyvale, Calif., the interconnect 907 may be implemented as a system request interface device. In any case, the processor cores 901A and 901B communicate through the interconnect 907 with an input/output interface 909 and a memory controller 910. The input/output interface 909 provides a communication interface between the processor unit 805 and the bus 813. Similarly, the memory controller 910 controls the exchange of information between the processor unit 805 and the system memory 807. With some implementations, the processor unit 805 may include additional components, such as a high-level cache memory accessible shared by the processor cores 901A and 901B. It also should be appreciated that the description of the computer network illustrated in FIG. 8 and FIG. 9 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope disclosure as set forth in the appended claims. For example, while specific terminology has been employed above to refer to electronic design automation processes, it should be appreciated that various examples may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

What is claimed is:

1. A method comprising:
    populating, by a processor, an environmental model having an environment coordinate field for a vehicle with first vehicle sensor data received from a first vehicle sensor having a first modality, wherein the first vehicle sensor data is raw measurement data from the first vehicle sensor, and wherein the populating of the environmental model with the first vehicle sensor data includes spatially aligning a first measurement coordinate field of the first vehicle sensor to the environmental coordinate field for the vehicle;
    detecting, via the processor, an unknown object based, at least in part, on the first vehicle sensor data populated in the environmental model;
    populating, by the processor, the environmental model with second vehicle sensor data received from a second vehicle sensor having a second modality, wherein the second vehicle sensor data is associated with the unknown object and is raw measurement data from the second vehicle sensor, and wherein the populating of the environmental model with the second vehicle sensor data includes spatially aligning a second measurement coordinate field of the second vehicle sensor to the environmental coordinate field for the vehicle;
    combining the raw measurement data corresponding to the first vehicle sensor data and the raw measurement data corresponding to the second vehicle sensor data, to yield multi-sensor data for the vehicle; and
    classifying, via the processor, the unknown object as a known object based, at least in part, on the multi-sensor data for the vehicle.

2. The method of claim 1, wherein detecting the unknown object further includes:
monitoring a region of interest in the environment coordinate field for the vehicle, the region of interest being defined based on safety of the vehicle; and
detecting the unknown object within the region of interest in the environment coordinate field.

3. The method of claim 2, wherein the second vehicle sensor data is associated with the region of interest in the environment coordinate field.

4. The method of claim 1, wherein:
the unknown object is one of an occluded object, a dimly illuminated object, and an obscured object; and
a portion of the unknown object is undetectable using the first modality and detectable using the second modality.

5. The method of claim 1, wherein the combining of the first vehicle sensor data and the second vehicle sensor data further comprises a sensor fusion unit temporally aligning the first vehicle sensor data and the second vehicle sensor data.

6. The method of claim 1, further comprising tracking the unknown object based on the multi-sensor data for the vehicle.

7. The method claim 6, further comprising:
tracking the unknown object over time as the vehicle is moving by collecting additional data associated with the unknown object from the first vehicle sensor and the second vehicle sensor,
wherein the classifying of the unknown object is further based, on the tracking of the unknown object over time.

8. An apparatus comprising at least one memory device storing instructions configured to cause one or more processing devices to perform operations comprising:
populating an environmental model having an environment coordinate field for a vehicle with first vehicle sensor data received from a first vehicle sensor having a first modality, wherein the first vehicle sensor data is raw measurement data from the first vehicle sensor, and wherein the populating of the environmental model with the first vehicle sensor data includes spatially aligning a first measurement coordinate field of the first vehicle sensor to the environmental coordinate field for the vehicle;
detecting an unknown object in a monitored portion of the environment coordinate field associated with the vehicle based, at least in part, on the first vehicle sensor data populated in the environmental model;
populating the environmental model with second vehicle sensor data received from a second vehicle sensor having a second modality, wherein the second vehicle sensor data is associated with the unknown object and is raw measurement data from the second vehicle sensor, and wherein the populating of the environmental model with the second vehicle sensor data includes spatially aligning a second measurement coordinate field of the second vehicle sensor to the environmental coordinate field for the vehicle;
combining the raw measurement data corresponding to the first vehicle sensor data and the raw measurement data corresponding to the second vehicle sensor data, to yield multi-sensor data for the vehicle; and
classifying the unknown object as a known object based, at least in part, on the multi-sensor data for the vehicle.

9. The apparatus of claim 8, wherein detecting the unknown object further includes:
monitoring a region of interest in the environment coordinate field, the region of interest being defined based on safety of the vehicle; and
detecting the unknown object within the region of interest in the environment coordinate field.

10. The apparatus of claim 9, wherein the second vehicle sensor data is associated with the region of interest in the environment coordinate field.

11. The apparatus of claim 8, wherein:
the unknown object is one of an occluded object, a dimly illuminated object, and an obscured object; and
a portion of the unknown object is undetectable using the first modality and detectable using the second modality.

12. The apparatus of claim 8, wherein the instructions are further configured to cause the one or more processing devices to perform operations comprising:
tracking the unknown object over time based on the multi-sensor data for the vehicle,
wherein the classifying of the unknown object is based on the tracking.

13. A system, comprising:
a memory device configured to store machine-readable instructions; and
a computing system including one or more processing devices, in response to executing the machine-readable instructions, configured to:
populate an environmental model having an environment coordinate field for a vehicle with first vehicle sensor data received from a first vehicle sensor having a first modality, wherein the first vehicle sensor data is raw measurement data from the first vehicle sensor, and wherein the populating of the environmental model with the first vehicle sensor data includes spatially aligning a first measurement coordinate field of the first vehicle sensor to the environmental coordinate field for the vehicle;
detect an unknown object in a monitored portion of the environment coordinate field associated with the vehicle based, at least in part, on the first vehicle sensor data populated in the environmental model;
populate the environmental model with second vehicle sensor data received from a second vehicle sensor having a second modality, wherein the second vehicle sensor data is associated with the unknown object and is raw measurement data from the second vehicle sensor, and wherein the populating of the environmental model with the second vehicle sensor data includes spatially aligning a second measurement coordinate field of the second vehicle sensor to the environmental coordinate field for the vehicle;
combine the raw measurement data corresponding to the first vehicle sensor data and the raw measurement data corresponding to the second vehicle sensor data, to yield multi-sensor data for the vehicle; and
classify the unknown object as a known object based, at least in part, on the multi-sensor data for the vehicle.

14. The system of claim 13, wherein to detect the unknown object the one or more processing devices, in response to executing the machine-readable instructions, are configured to:
monitor a region of interest in the environment coordinate field, the region of interest being defined based on safety of the vehicle; and
detect the unknown object within the region of interest in the environment coordinate field.

15. The system of claim 14, wherein the second vehicle sensor data is associated with the region of interest in the environment coordinate field.

16. The system of claim 14, wherein the one or more processing devices, in response to executing the machine-readable instructions, are configured to:
   track the unknown object over time as the vehicle is moving by collecting additional data from the first vehicle sensor and the second vehicle sensor,
   wherein the classifying of the unknown object is based on tracking of the unknown object over time.

17. The system of claim 13, wherein:
   the unknown object is one of an occluded object, a dimly illuminated object, and an obscured object; and
   a portion of the unknown object is undetectable using the first modality and detectable using the second modality.

* * * * *